United States Patent
Bastide et al.

(10) Patent No.: US 9,961,040 B2
(45) Date of Patent: May 1, 2018

(54) SOCIAL NETWORK AND COLLABORATION COMMUNICATIONS ROUTING ENHANCEMENT

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US); Dale M. Schultz, Limerick, ME (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 14/860,747

(22) Filed: Sep. 22, 2015

(65) Prior Publication Data
US 2017/0085516 A1     Mar. 23, 2017

(51) Int. Cl.
*G06F 15/16* (2006.01)
*H04L 12/58* (2006.01)
*H04L 12/707* (2013.01)

(52) U.S. Cl.
CPC .............. *H04L 51/32* (2013.01); *H04L 45/22* (2013.01); *H04L 51/14* (2013.01)

(58) Field of Classification Search
USPC .................. 709/206, 202, 204, 205, 224
See application file for complete search history.

(56) References Cited

U.S. PATENT DOCUMENTS

| 8,149,850 B2 | 4/2012 | Krishnamurthi et al. |
| 2003/0139902 A1 | 7/2003 | Geib et al. |
| 2008/0140788 A1 | 6/2008 | Carter et al. |
| 2009/0292578 A1 | 11/2009 | Danis et al. |
| 2010/0121849 A1 | 5/2010 | Goeldi |
| 2013/0018955 A1 | 1/2013 | Thaxton et al. |

FOREIGN PATENT DOCUMENTS

WO     0117276 A2     3/2001

OTHER PUBLICATIONS

Disclosed Anonymously, "(RPML) Method to utilize Instant Messaging as follow up to Urgent Email", IP.com No. 000208834, Electronic Publication: Jul. 19, 2011, pp. 1-2.

(Continued)

*Primary Examiner* — Lan-Dai T Truong
(74) *Attorney, Agent, or Firm* — Michael A. Petrocelli

(57) ABSTRACT

A method for routing communications on an online social network includes monitoring communications between users on an online social network on a communications system. A processing issue with a message of the communications is identified based on a rule, wherein the message is from a sender to a receiver. The method and system includes analyzing a recipient social network for an alternative recipient user to receive the message based on a similarity criteria. A processing model is applied to the message to determine an action to improve processing efficiency of the message. The action includes routing the message to the alternative recipient user. The method and system includes performing the action to facilitate the processing efficiency, responsive to determining an action.

20 Claims, 3 Drawing Sheets

(56) References Cited

OTHER PUBLICATIONS

SaneBox, "SaneBox for Business", https://www.sanebox.com/business, printed on Feb. 23, 2015, pp. 1-2.
IBM, "SPSS Text Analytics for Surveys", http://www-03.ibm.com/software/products/en/spss-text-analytics-surveys, printed on Feb. 23, 2015, pp. 1-2.
IBM, "SPSS Statistics", http://www-01.ibm.com/software/analytics/spss/products/statistics/, printed on Feb. 23, 2015, pp. 1-2.
Wikipedia, the free encyclopedia, "Graph theory", http://en.wikipedia.org/wiki/Graph_theory, printed on Feb. 23, 2015, pp. 1-12.
Wikipedia, the free encyclopedia, "Natural language processing", http://en.wikipedia.org/wiki/Natural_language_processing, printed on Feb. 23, 2015, pp. 1-10.
Wikipedia, the free encyclopedia, "Matching (graph theory)", http://en.wikipedia.org/wiki/Matching_(graph_theory), printed on Feb. 23, 2015, pp. 1-8.
Wikipedia, the free encyclopedia, "Deep Learning", https://en.wikipedia.or/wiki/Deep_learning, printed on Sep. 21, 2015, pp. 1-29.
Reed, "Facebook Looks to Improve News Feed Content Quality", Marketing Pilgrim, posted Aug. 26, 2013, pp. 1-6.
Slashdot, "Facebook Launches Advanced AI Effort to Find Meaning in Your Posts", Posted Sep. 21, 2013, http://tech.slashdot.org/story/13/09/21/1831239/facebook-launches-advanced-ai-effort-to-find-meaning-in-your-posts, pp. 1-12.
Tarbaj, "Understanding Facebook's EdgeRank", socialmediatoday, posted Feb. 2, 2013, http://socialmediatoday.com/node/1205641, pp. 1-8.
Bastide et al., Pending U.S. Appl. No. 14/220,554, filed Mar. 20, 2014, entitled: "Providing Social Network Feedback", pp. 1-44.

SOCIAL NETWORK AND COLLABORATION COMMUNICATIONS ROUTING ENHANCEMENT

BACKGROUND

The present disclosure relates to a method and system for routing communications on a social network. Online social networks can be used to connect users and enable communications and sharing between users, including sharing information, posts, pictures, etc. Online social networks can include communication systems or networks using a local network, a wide area network, utilizing the Internet, or a mail client including web based email. Common techniques of sharing and processing information can include an inbox, a post, or a profile on a social network.

These techniques enable users to communicate and share information with others, and provide a universal mechanism to connect people and information in organized ways which enable sharing and processing of information between the users. Common mechanisms for sharing and processing information is an inbox of a mail client, a common post area, an activity stream, a timeline, or a profile. These mechanisms enable a user to share information with others and gather information from others in a network. A user can create, read, and respond to countless messages each day. The messages can be sent to a select group of users with the intent that users in the network respond or take some kind of action. However, messages and communication can go unread, unanswered, and otherwise not responded to. This lack of response can cause inefficiency, ineffectiveness, and loss of time for a sender who requires a response or is waiting for a response.

SUMMARY

According to an aspect of the present invention, a computer implemented method routes communications on an online social network. The method includes monitoring communications between users on an online social network on a communications system. A processing issue with a message of the communications is identified based on a rule, wherein the message is from a sender to a receiver. The method includes analyzing a recipient social network for an alternative recipient user to receive the message based on a similarity criteria. A processing model is applied to the message to determine an action to improve processing efficiency of the message. The action includes routing the message to the alternative recipient user. The method includes performing the action to facilitate the processing efficiency, responsive to determining an action.

In another aspect according to the present invention a computer program product routes communications on an online social network. The computer program product comprises a computer readable storage medium having program instructions embodied therewith, wherein the computer readable storage medium is not a transitory signal per se. The program instructions executable by a computer to cause the computer to perform a method, comprising: monitoring communications between users on an online social network on a communications system; identifying a processing issue with a message of the communications based on a rule, the message from a sender to a receiver; analyzing a recipient social network for an alternative recipient user to receive the message based on a similarity criteria; applying a processing model to the message to determine an action to improve processing efficiency of the message, the action including routing the message to the alternative recipient user; and performing the action to facilitate the processing efficiency, responsive to determining an action.

In another aspect according to an embodiment of the invention, a computer system routes communications on an online social network. The computer system comprises: one or more computer processors, one or more computer-readable storage media, and program instructions stored on one or more of the computer-readable storage media for execution by at least one of the one or more processors. The program instructions, comprise: monitoring communications between users on an online social network on a communications system; identifying a processing issue with a message of the communications based on a rule, the message from a sender to a receiver; analyzing a recipient social network for an alternative recipient user to receive the message based on a similarity criteria; applying a processing model to the message to determine an action to improve processing efficiency of the message, the action including routing the message to the alternative recipient user; and performing the action to facilitate the processing efficiency, responsive to determining an action.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

Figure 1:
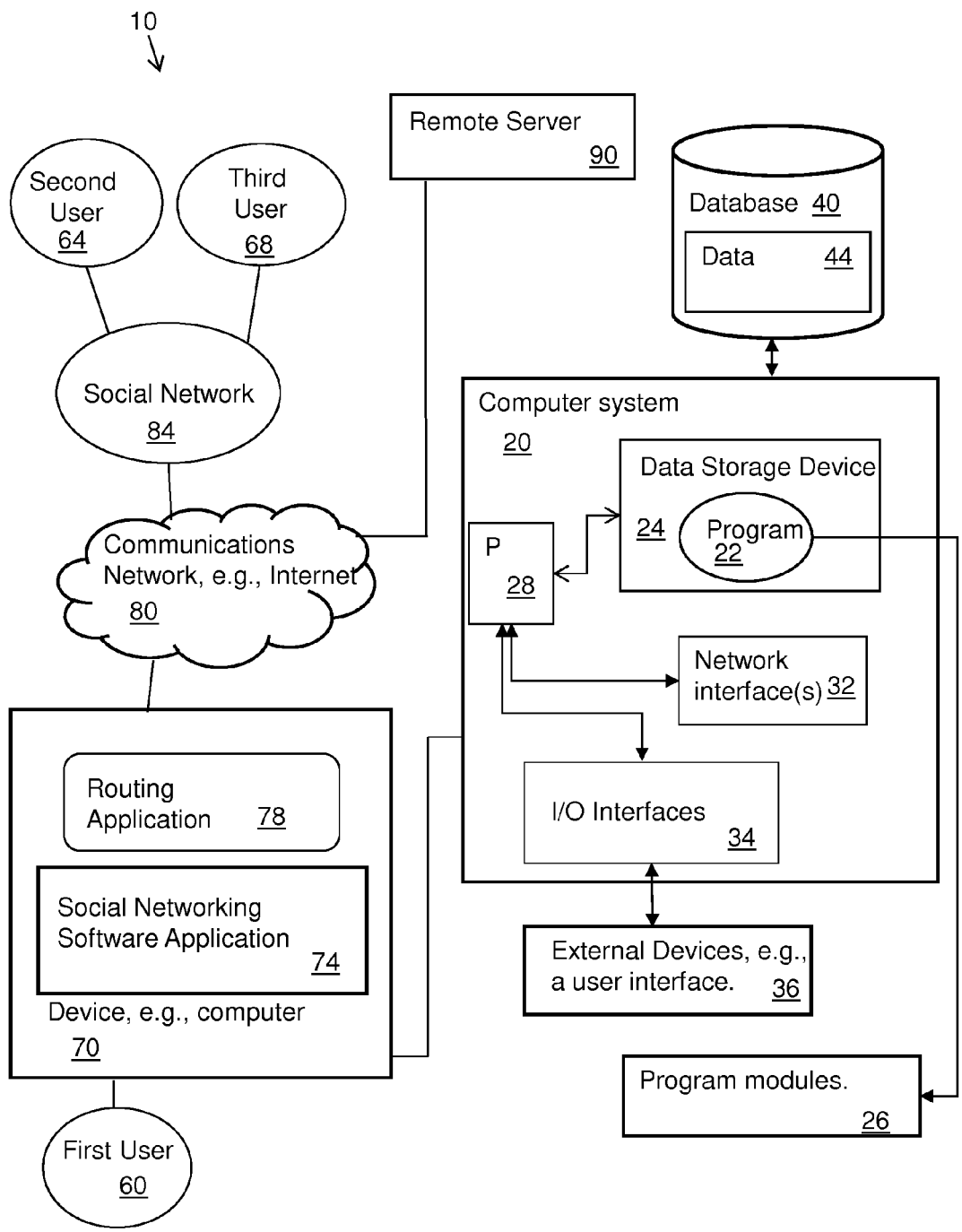
FIG. 1 is a schematic block diagram illustrating an overview of a system and methodology for routing communications on an online social network according to an embodiment of the disclosure.
Figure 2:
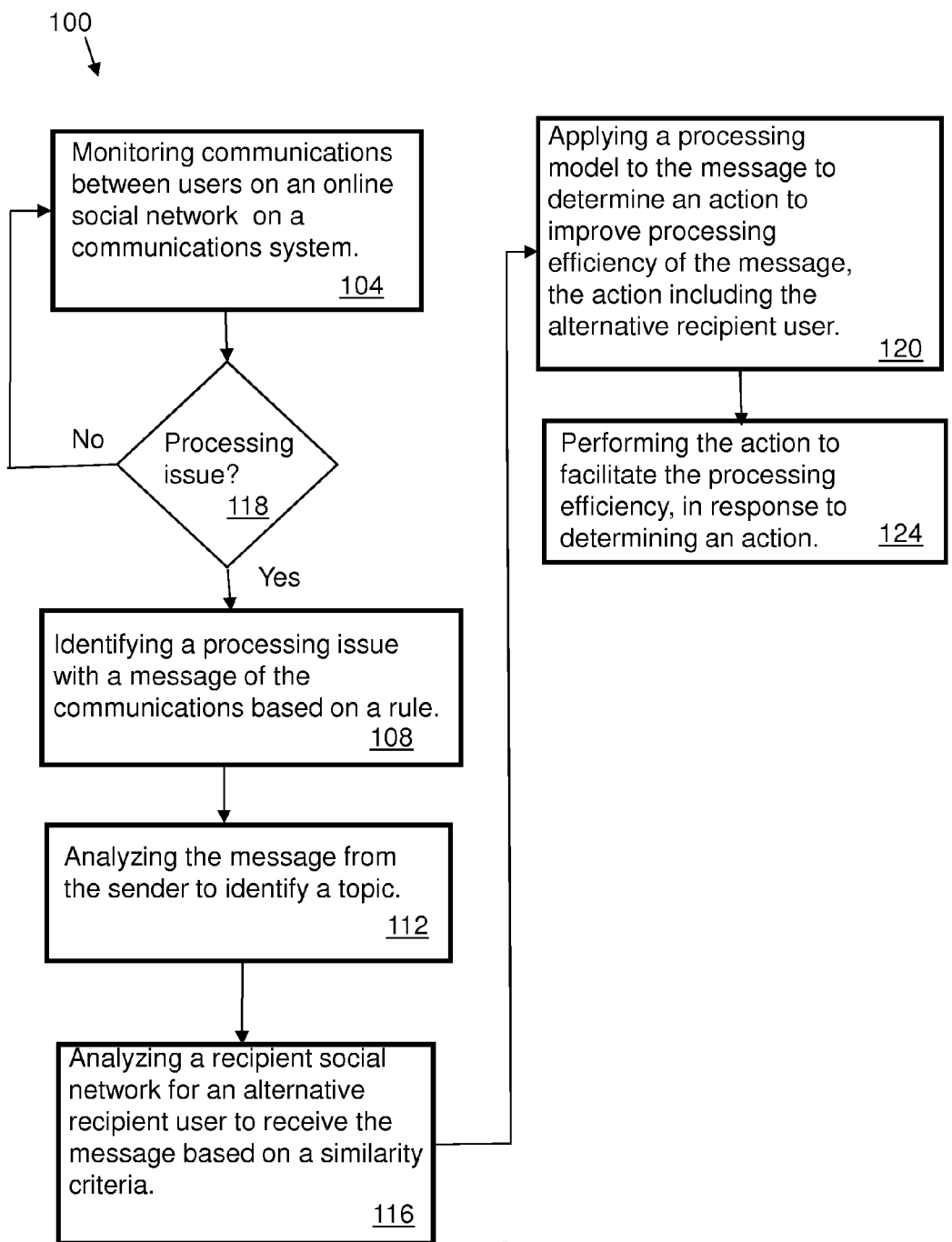
FIG. 2 is a flow chart illustrating a method for routing communications on an online social network based on the system shown in FIG. 1, according to an embodiment of the disclosure.
Figure 3:
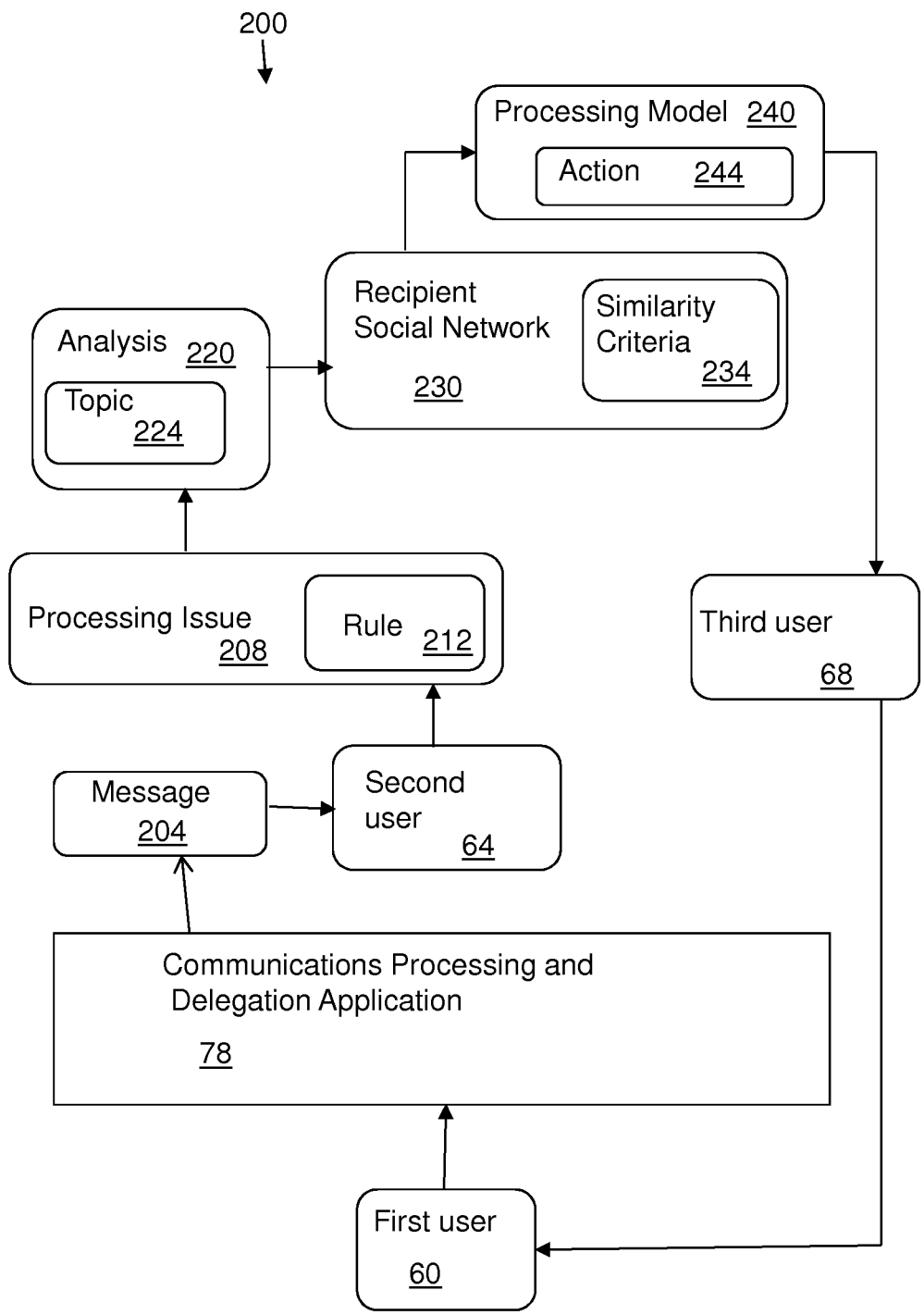
FIG. 3 is a functional block diagram functionally depicting a system for routing communications on an online social network according to the method and system shown in FIGS. 1 and 2, according to an embodiment of the disclosure.

Referring to FIGS. 1, 2 and 3 a system 10 and method 100 according to an embodiment of the present disclosure for routing or re-routing communications on an online social network using a communications system. Users, represented as first user 60, second user 64, and third user 68, are shown in FIG. 1. As a representative example, the first user 60 is shown using a device 70, which is representative of a computer or other computing device for each of a plurality of users. The method 100 includes monitoring communications between users on an online social network on a communications system, as in block 104. The first user 60 can access the social network 84 using a device 70, for example a computer, via a communications system embodied as communications network 80, which can include, for example, the Internet, a telephone system, or a local area network. It is understood that the second and third user, as representative of a plurality of users also access the social network as the first user 60.

The device 70 includes a computer system 20. The device 70 can be a computer or a mobile device, or other types of computer devices. The device 70 includes a social networking software application 74 (also referred to as a social networking application), or can access a social network using a web browser (not shown) for accessing the Internet and accessing websites on the World Wide Web. A routing application 78 embodying the method of the present disclosure can be is included on the device 70, and can be a separate application as shown in FIG. 1, and alternatively can be part (or integral with) the social networking application.

Referring to FIG. 2, block 118 includes determining when a processing issue has occurred. When a processing issue has not occurred, the method returns to block 104. When a processing issue is detected, the method proceeds to block 108.

The method further includes identifying a processing issue 208 regarding a message 204 of the communications based on a rule 212 (FIG. 3), as in block 108. The message 204 is from a sender to a receiver, for example from the first user 60 to the second user 64. The processing issue can include a number of issues identified according to one or more rules regarding the processing of the communications message. For instance, the processing issue can include a threshold number of messages in an e-mail in-box of a mail system, or a threshold number of unread messages in an in-box.

Referring to FIGS. 2 and 3, a functional diagram 200 depicts the process of the present disclosure with references to the method and system of FIGS. 2 and 1, respectively. The method further includes analyzing 220 the message from the sender to identify a topic 224, as in block 112. The topic can be matched to an expertise of a possible recipient to meet a similarity criteria. The topic can further assist in matching an alternative recipient using the similarity criteria by matching the topic to other posts by a possible recipient, or by matching a topic to a skill of an alternative recipient. For instance, the topic can be about software development, and a user may have a skill (determined, for example, by posts, comments, title, or skills) or title as a software engineer.

The method 100 further includes analyzing a recipient social network 230 for an alternative recipient user to receive the message 204 based on a similarity criteria 234, as in block 116. The recipient's social network can include a social network of users, and also users previously having a message sent to them, as a primary recipient or copied (cc:). The similarity criteria can include similarities between the intended recipient and an alternative recipient, such as, similar titles, skills, experience, and topics in posts. Similarities can also include users in a similar workgroup, or a manager in the same group as the intended recipient, or a manager in a management hierarchy.

The similarity criteria can also include modeling a first user's social network including recipients (including user's copied on a message), and comparing the generated model to a second user's (e.g., recipient's) social network to determine characteristics of similarity as discussed above. Thereafter, the message can be routed or re-routed based on the similarity.

A processing model 240 is applied to the message to determine an action 244 to improve processing efficiency of the message, wherein the action includes the alternative recipient user, as in block 120. The action can include alerting alternative recipients, or copying alternative recipients. The action can be to re-route the message to the alternative recipient, and alternatively re-routing the message to the alternative recipient in addition to the original recipient. The message can also be routed to a set or group of recipients.

The method performs the action to facilitate the processing efficiency, in response to determining an action, as in block 124. The action 244 includes routing or re-routing the message 204 to a third user 68 wherein the third user is selected from the second user's (as a recipient) social network. The third user meets the similarity criteria 234 and is selected as an alternative user. The method can alternatively select a set of users from the second user social network as alternative recipients and the first user (as an originating user or sender) can select a user from the set of alternative recipients. In the present example, the message 204 is sent to the third user 68.

Thus, the third user selected based on the similarity criteria and as in the method facilitates the processing of the original message. In one example the sender receiving a reply from the third user as an alternative to the second user (or the original recipient) facilitates a reply to the original sender. Thus, the sender can continue with their work or process having received a reply to their message, thus improving their efficiency and flow of work.

The method of the present disclosure can also present a set of alternative recipients of a message meeting the similarity criteria to a sender. The message is sent to a selected alternative recipient of the set of alternative recipients, in response to the sender's selection of the alternative recipient.

The communications system used in the present disclosure can include: instant messaging (IM), short message services (SMS), a blog, a web site, a social network; a news feed, and emails.

In one embodiment, three users, user1, user2, and user3 are members of a collaborative environment of an organization and each has their own social network within larger organizational network. Thus, there is a user social network and a larger organizational network, which for example, can be for employment. User1 needs to address a customer support issue and sends a communication or a message to user2. The method and system of the present disclosure checks the number of unread messages for user2. If the number of messages meets or exceeds a threshold amount (in this example, which identifies a processing issue), for example, one hundred unread messages, an action is initiated. In this example, user2 has ten messages over the threshold of one hundred. The method analyzes user2's social network for other users meeting a criteria. The analysis can include user2's social network as well as a larger organizational network. A determination is made using the criteria that user3 has sufficient similarity to user2. User1 is presented user3 as an alternative and can be presented a plurality of users and select the user of their choice. In this example user1 selects user3 and the original message is sent to user3. User3 responds to the message from user1 and user1 is more productive than if they had waited for user2 to answer. The criteria and/or the reason why an alternative recipient is chosen using the criteria can be presented to user1 as well.

In another embodiment based on the above example, a user can set a utilization threshold, for example, ninety percent. When a message is received at the user, and the threshold is met or exceeded, the method analyzes the user's social network in comparison to the organizational network and determines other users that can handle the message based on the criteria. The originally intended recipient can be copied on the re-routed messages as it is sent to an alternative user. The method can also alert the originating user that the message has been re-routed.

The method and system of the present disclosure can operate in any environment that enables messaging, Email, online Social Networking, and management or project tools. Rules for ascertaining a processing issue can include, for example, an out-of-office notification being activated on a recipient's email, or an activity threshold for an email account. A threshold amount of unread message, or a time to turn around or process a received message and send a reply. The threshold can include a total number of messages received, or sent and received. Another example rule can include a threshold time since a last unread message.

Thresholds may be applied to individual users, an organization, be system-based or be applied as a policy. In another example, thresholds may be used in combination. The rules may include a feedback mechanism that can be used in a confidence metric. Other metrics may be generated based on probability to generate a confidence metric.

The criteria or similarity criteria for initiating an alternative recipient can include a message routing intent, which can include the intended recipient and users copied on the message. Alternative recipients can be presented as a typeahead such that when a user types a recipient, one or more alternative users is presented to the user for selection. In one embodiment, sending a message can activate the method of the present disclosure, or can prompt a user to activate the features of the method.

In one embodiment the method can be applied when the message is sent without ascertaining a processing issue, thus providing alternative recipients immediately after sending the message. In the scenario where a user activates the method of the present disclosure to automatically find alternative recipients without a processing issue and route the message to the alternatives, the user does not have to wait, or manually activate delegates, or wait for a criteria to be met for alternative recipients to be notified. In this embodiment, alternative recipients are notified as is the designated recipient, and the originating user or sender increases their likelihood of receiving a reply promptly by having several recipients in position to respond to their communication. Alternative recipients can include one or more users or a set of users.

In one embodiment according to the present disclosure, the method and system can determine a designated recipient (e.g., in a To: field or a CC: (copied) field, etc.), and extract the designated recipient. The method can also determine recipients which overlap with the receiver's network. When a recipient overlaps with a person in the recipient's network, this can be interpreted as increasing the likelihood that the overlapping person has a higher similarity to the originally intended recipient.

The similarity criteria can include using a graph theory technique, and can include ascertaining a topic and/or subject of messages. Graph theory can be used to include attribute nodes and match skills and job roles of users to meet the similarity criteria. The graph can be stored locally or remotely. In another example, algorithms can be used to match similar users as part of the similarity criteria. A similarity criteria can also include logic, or statistical analysis to ascertain similar recipients to the recipient selected by a sender.

Embodiments of the present disclosure can be applied to a single organization, company, or a social network available to the general public. The method and system of the present disclosure can be applied to only public communications or only private communications or both. Analyzing a message can be applied to the entire message or restricted to specified fields, for example, the recipient, and those copied on the message.

The method 100 can be implemented using the routing application 78 shown in FIG. 1. The method can also be provided as a service which can be remote, for instance, including an application residing on a remote server exemplified by remote server 90.

The device or computer 70 may also be a mobile device. A mobile device is one embodiment of a device having a computer or computer system 20, which is depicted generically in FIG. 1. Other devices having a computer or described as a computer or computer system may include, for example, a Personal Data Assistant (PDA), a cell phone, or a notebook, a desktop computer, or the like. The device in the present disclosure can be configured to send and receive electronic communications. The computer system 20 is a generic representation of a computer which may be embodied in a device such as a hand held device, or can also represent a server for providing the method of the present disclosure as a service which can be accessible using the Internet or a network.

In one embodiment according to the present disclosure, the method 100 may be embodied in a program 22 (FIG. 1) embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program. The method of the present disclosure can be run locally on a device such as the mobile device, or can be run a service, for instance, on a remote server 90 which is accessed using the communications network 80.

It is understood that a computer or a program running on the computer may communicate with a server computer via a communications network. The communications network may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A computer implemented method for routing communications on an online social network, comprising:
   monitoring communications between users on an online social network on a communications system, the users communicating using devices, respectively, and the devices connecting to the online social network using the communications system, and wherein each of the devices include a computer;
   identifying a processing issue with a message of the communications based on a rule, the message from a sender to a receiver, the message being communicated from the devices of the users to the online social network via the communications system;
   analyzing a recipient social network for an alternative recipient user to receive the message based on a similarity criteria;
   applying a processing model to the message to determine an action to improve processing efficiency of the message, the action including routing the message to the alternative recipient user via the recipient social network; and
   performing the action to facilitate the processing efficiency, responsive to determining an action.

2. The method of claim 1, further comprising:
   analyzing the message from the sender to identify a topic, and the similarity criteria including the topic.

3. The method of claim 1, wherein the action includes a routing change for the message, the routing change including sending the message to an alternative user meeting the similarity criteria.

4. The method of claim 1 wherein the action includes the routing of the message to the alternative recipient in addition to the receiver.

5. The method of claim 1, wherein the action including a routing change for the message, the routing change including sending the message to a set of alternative users meeting the similarity criteria.

6. The method of claim 1, further comprising:
   presenting a set of alternative recipients meeting the similarity criteria; and
   sending the message to a selected alternative recipient of the set of alternative recipients, in response to the sender's selection of the alternative recipient.

7. The method of claim 1, wherein the rule for determining a processing issue includes: identifying a threshold number of unread messages.

8. The method of claim 1, wherein a plurality of rules for determining a processing issue include using logic, graphs or statistical analysis to determine a processing issue.

9. The method of claim 1, wherein the similarity criteria for re-routing a message includes: similar skills; similar title; and similar experience.

10. The method of claim 1, wherein the communications system includes: instant messaging (IM), short message services (SMS), a blog, a web site, a social network; a news feed, and emails.

11. A computer program product for routing communications on an online social network, the computer program product comprising a computer readable storage medium having program instructions embodied therewith, wherein the computer readable storage medium is not a transitory signal per se, the program instructions executable by a computer to cause the computer to perform a method, comprising:
    monitoring communications between users on an online social network on a communications system;
    identifying a processing issue with a message of the communications based on a rule, the message from a sender to a receiver;
    analyzing a recipient social network for an alternative recipient user to receive the message based on a similarity criteria;
    applying a processing model to the message to determine an action to improve processing efficiency of the message, the action including routing the message to the alternative recipient user; and
    performing the action to facilitate the processing efficiency, responsive to determining an action.

12. The computer program product of claim 11, further comprising:
    analyzing the message from the sender to identify a topic, and the similarity criteria including the topic.

13. The computer program product of claim 11, wherein the action includes a routing change for the message, the routing change including sending the message to an alternative user meeting the similarity criteria.

14. The computer program product of claim 11, wherein the action includes the routing of the message to the alternative recipient in addition to the receiver.

15. The computer program product of claim 11, wherein the action including a routing change for the message, the routing change including sending the message to a set of alternative users meeting the similarity criteria.

16. The computer program product of claim 11, further comprising:
    presenting a set of alternative recipients meeting the similarity criteria; and
    sending the message to a selected alternative recipient of the set of alternative recipients, in response to the sender's selection of the alternative recipient.

17. The computer program product of claim 11, wherein the rule for determining a processing issue includes: identifying a threshold number of unread messages.

18. A computer system for routing communications on an online social network, the computer system comprising:
    one or more computer processors, one or more computer-readable storage media, and program instructions stored on one or more of the computer-readable storage media for execution by at least one of the one or more processors, the program instructions, comprising:
    monitoring communications between users on an online social network on a communications system;
    identifying a processing issue with a message of the communications based on a rule, the message from a sender to a receiver;
    analyzing a recipient social network for an alternative recipient user to receive the message based on a similarity criteria;
    applying a processing model to the message to determine an action to improve processing efficiency of the message, the action including routing the message to the alternative recipient user; and performing the action to facilitate the processing efficiency, responsive to determining an action.

19. The system of claim 18, further comprising:
analyzing the message from the sender to identify a topic, and the similarity criteria including the topic.

20. The system of claim 18, wherein the action includes a routing change for the message, the routing change including sending the message to an alternative user meeting the similarity criteria.

* * * * *